United States Patent
Cheng et al.

(10) Patent No.: US 6,719,054 B2
(45) Date of Patent: Apr. 13, 2004

(54) METHOD FOR ACID STIMULATING A SUBTERRANEAN WELL FORMATION FOR IMPROVING HYDROCARBON PRODUCTION

(75) Inventors: Alick Cheng, Calgary (CA); Jim B. Surjaatmadja, Duncan, OK (US); Matthew J. Rees, Calgary (CA); Abraham Khallad, Calgary (CA); Keith A. Rispler, Red Deer (CA)

(73) Assignees: Halliburton Energy Services, Inc., Duncan, OK (US); Petro-Canada, Calgary ( * ) Notice: Subject to any disclaimer, the term of this patent is extended or adjusted under 35 U.S.C. 154(b) by 57 days.

(21) Appl. No.: 09/966,129

(22) Filed: Sep. 28, 2001

(65) Prior Publication Data

US 2003/0062166 A1 Apr. 3, 2003

(51) Int. Cl.⁷ ............................ E21B 43/26; E21B 7/18; E21B 43/25
(52) U.S. Cl. ................ 166/308; 166/300; 166/307; 166/309
(58) Field of Search ............................ 166/292, 177.5, 166/279, 280, 297, 298, 222, 300, 307, 308, 309

(56) References Cited

U.S. PATENT DOCUMENTS

| | | | |
|---|---|---|---|
| 2,802,537 A | 8/1957 | Goldinger | 166/224 |
| 4,044,833 A | 8/1977 | Volz | 166/307 |
| 4,453,596 A | 6/1984 | Conway et al. | 166/278 |
| 4,453,597 A | 6/1984 | Brown et al. | 166/303 |
| 4,480,696 A * | 11/1984 | Almond et al. | 166/308 |
| 4,554,082 A * | 11/1985 | Holtmyer et al. | 166/308 |
| 4,730,676 A | 3/1988 | Luers et al. | 166/309 |
| 5,203,724 A * | 4/1993 | Casey | 166/281 |
| 5,335,724 A * | 8/1994 | Venditto et al. | 166/298 |
| 5,361,856 A | 11/1994 | Surjaatmadja et al. | 175/67 |
| 5,392,859 A * | 2/1995 | Adams et al. | 166/300 |
| 5,494,103 A | 2/1996 | Surjaatmadja et al. | 166/222 |
| 5,499,678 A | 3/1996 | Surjaatmadja et al. | 166/298 |
| 5,765,642 A | 6/1998 | Surjaatmadja | 166/297 |

FOREIGN PATENT DOCUMENTS

| | | | |
|---|---|---|---|
| EP | 0229434 | 12/1986 | E21B/43/243 |
| EP | 0851094 | 12/1997 | E21B/43/26 |
| WO | WO 02/23010 | 3/2002 | E21B/43/26 |

OTHER PUBLICATIONS

"Hydrajet Fracturing: An Effective Method for Placing Many Fractures in Openhole Horizontal Wells" (SPE 48856) by J. B. Surjaatmaja, et al. 1998.

* cited by examiner

Primary Examiner—David Bagnell
Assistant Examiner—Brian Halford
(74) Attorney, Agent, or Firm—Robert A. Kent; Warren B. Kice

(57) ABSTRACT

A method of stimulating a downhole formation according to which a plurality of jet nozzles are located in a spaced relation to the wall of the formation to form an annulus between the nozzles and the formation. An acid-containing, stimulation fluid is pumped at a predetermined pressure through the nozzles, into the annulus and against the wall of the formation. A gas is pumped into the annulus so that the stimulation fluid mixes with the gas to generate foam before the mixture is jetted towards the formation to impact the wall of the formation.

22 Claims, 2 Drawing Sheets

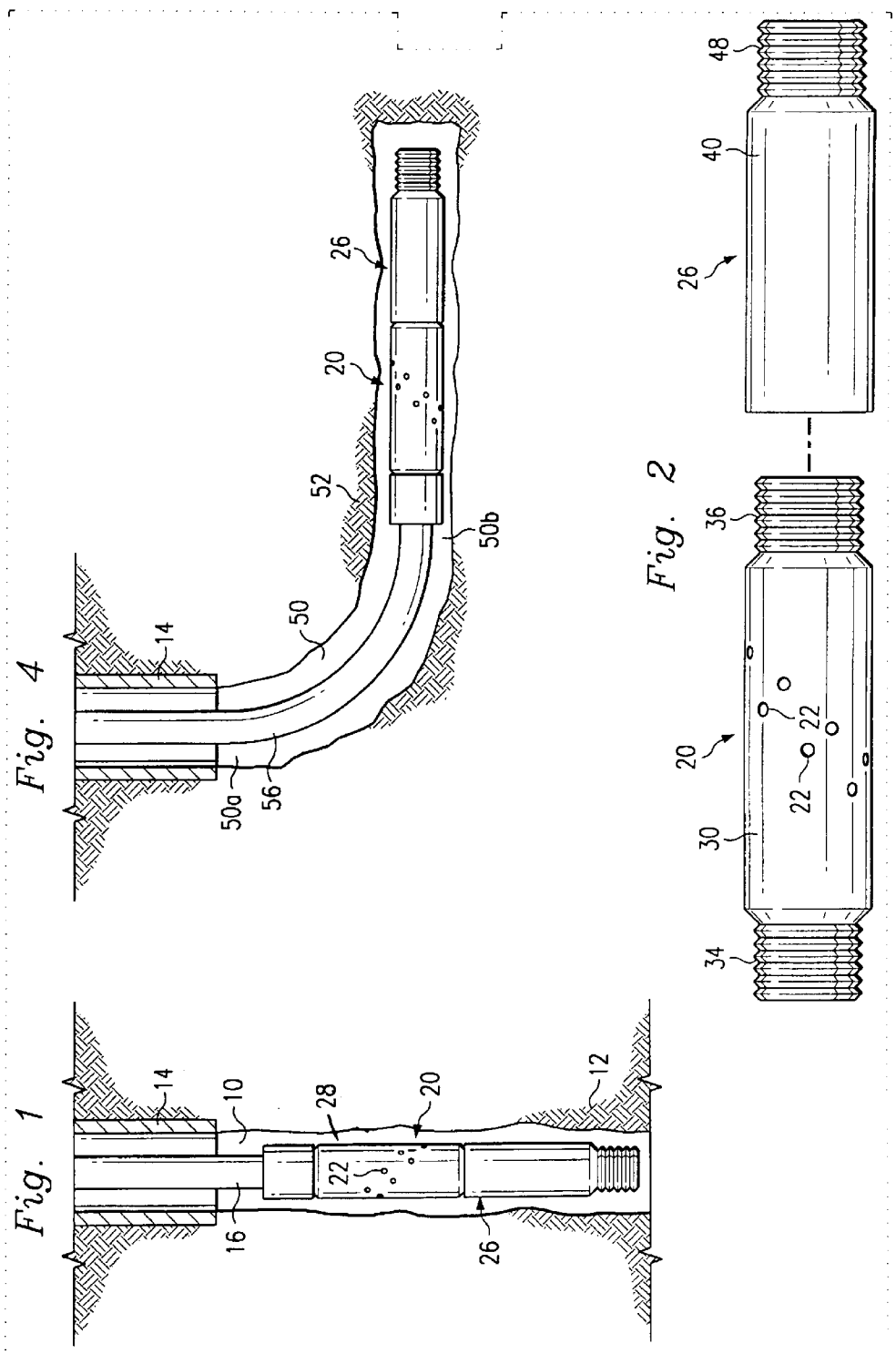

METHOD FOR ACID STIMULATING A SUBTERRANEAN WELL FORMATION FOR IMPROVING HYDROCARBON PRODUCTION

BACKGROUND

This disclosure relates to a method for treating a subterranean well formation to stimulate the production of hydrocarbons and, more particularly, such an apparatus and method for fracturing and squeezing the well formation.

Several techniques have evolved for treating a subterranean well formation to stimulate hydrocarbon production. For example, hydraulic fracture acidizing methods have often been used according to which a portion of a formation to be stimulated is isolated using conventional packers, or the like, and a stimulation fluid containing gels, acids, sand slurry, and the like, is pumped through the well bore into the isolated portion of the formation. The pressurized stimulation fluid pushes against the formation at a very high force to establish and extend cracks on the formation. However, the requirement for isolating the formation with packers is time consuming and considerably adds to the cost of the system.

Also, squeezing methods have been used which involve introducing stimulation fluids containing acids to carbonate type formations at a pressure that is higher than the formation pressure (but not as high as the fluid pressure in the fracturing methods), causing the fluid to infiltrate the pores in the formation and react with the formation to enlarge the pores. However, this is a relatively slow process and produces relatively small openings in the formation. Also, since these stimulation fluids are usually very reactive, especially at elevated temperatures, the fluid is often prematurely spent close to the wellbore in the formation. Thus, no extended reach is achieved and the fluid entry point is often greatly enlarged. As a result, it is impossible to form multiple, relatively long, and effective acid fingering throughout the wellbore face, especially in low-permeability reservoirs that require deep penetration.

Chemical reactivity of the acid can be reduced using many ways, and one of them is the use of foams. Since foams are also good leak off prevention material, they help in creating large fractures. Conventionally, foaming equipment is provided on the ground surface that creates a foam, which is then pumped downhole. Foams, however, have much larger friction coefficients and reduced hydrostatic effects, both of which severely increase the required pressures to treat the well.

Therefore, what is needed is a stimulation treatment that combines most or all features of the above types according to which the need for isolation packers is eliminated, the foam generation is performed in-situ downhole, the depth of penetration improved, and the reaction of the fracturing acid with the formation is controlled so that premature reaction of the acid with the formation is prevented.

SUMMARY

According to an embodiment of the present invention, the techniques of acid fracturing and squeezing are combined to produce an improved stimulation of the formation. To this end, a stimulation fluid is discharged through a workstring and into a formation at a relatively high impact pressure and velocity without the need for isolation packers to fracture the formation.

BRIEF DESCRIPTION OF THE DRAWINGS

FIG. 1 is a sectional view of a fracturing apparatus according to an embodiment of the present invention, shown in a vertical wellbore.

FIG. 2 is an exploded elevational view of two components of the apparatus of FIGS. 1 and 2.

FIG. 4 is a sectional view of a fracturing apparatus according to an embodiment of the present invention, shown in a wellbore having a horizontal deviation.

DETAILED DESCRIPTION

Figure 3:
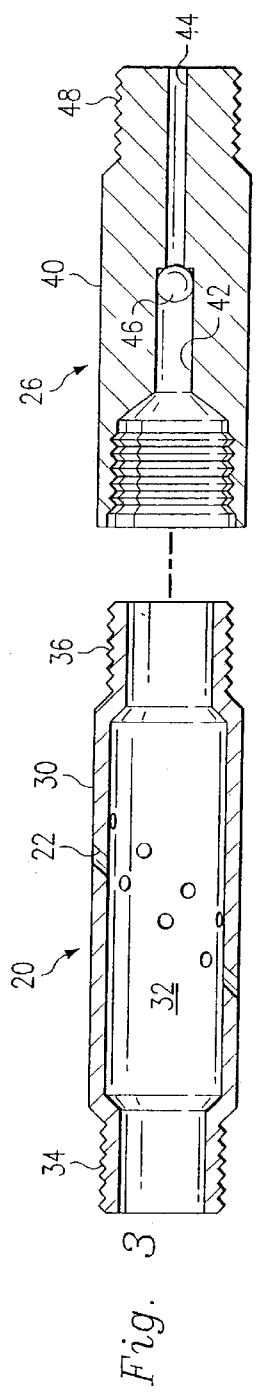
FIG. 3 is a cross-sectional view of the components of FIG. 2.

Referring to FIG. 1, a stimulation apparatus according to an embodiment of the present invention is shown installed in an underground, substantially vertically-extending, wellbore 10 that penetrates a hydrocarbon producing subterranean formation 12. A casing 14 extends from the ground surface (not shown) into the wellbore 10 and terminates above the formation. The stimulation apparatus includes a work string 16, in the form of piping or coiled tubing, that also extends from the ground surface and through the casing 14. The work string 16 extends beyond, or below, the end of the casing 14 as viewed in FIG. 1, and one end of the work string 16 is connected to one end of a tubular jet sub 20 in a manner to be described. The jet sub has a plurality of through openings 22 machined through its wall that form discharge jets which will be described in detail later.

A valve sub 26 is connected to the other end of the jet sub 20, also in a manner to be described. The end of the work string 16 at the ground surface is adapted to receive a stimulation fluid, to be described in detail, and the valve sub 26 is normally closed to cause flow of the stimulation fluid to discharge from the jet sub 22. The valve sub 26 is optional and is generally required for allowing emergency reverse circulation processes, such as during screenouts, equipment failures, etc. An annulus 28 is formed between the inner surface of the wellbore 10 and the outer surfaces of the workstring 16 and the subs 20 and 26.

The stimulation fluid includes a conventional acid that is used in squeezing or fracture acidizing, discussed above, along with various additives that are well known in the art. Typical fluids include mineral or organic acids, such as hydrochloric acid, formic acid, acetic acid, or a blend thereof. A more specific, but non-limiting, example of the type of fluid is a 28% hydrochloric acid containing gelling agents, corrosion inhibitors, iron-control chemicals, and chemicals for controlling sulfide cracking. Also, some sand and a foaming agent may be added to the fluid for reasons to be described. This mixture will hereinafter be referred to as "stimulation fluid."

The respective axes of the jet sub 20 and the valve sub 26 extend substantially vertically in the wellbore 10. When the stimulation fluid is pumped through the work string 16, it enters the interior of the jet sub 20 and discharges through the openings 22, into the wellbore 10, and against the formation 12.

Details of the jet sub 20 and the ball valve sub 26 are shown in FIGS. 2 and 3. The jet sub 20 is formed by a tubular housing 30 that includes a longitudinal flow passage 32 extending through the length of the housing. The openings 22 extend through the wall of the casing in one plane and can extend perpendicular to the axis of the casing as shown in FIG. 2, and/or at an acute angle to the axis of the casing as shown in FIG. 3, and/or aligned with the axis (not shown). Thus, the stimulation fluid from the work string 16 enters the housing 30, passes through the passage 32 and is discharged from the openings 22. The stimulation fluid discharge pattern is in the form of a disc extending around the housing 30.

As a result of the high pressure stimulation fluid from the interior of the housing 30 being forced out the relatively small openings 22, a jetting effect is achieved. This is caused by the stimulation fluid being discharged at a relatively high differential pressure, such as 3000–6000 psi, which accelerates the stimulation fluid to a relatively high velocity, such as 650 ft./sec. This high velocity stimulation fluid jetting into the wellbore 10 causes drastic reduction of the pressure surrounding the stimulation fluid stream (based upon the well known Bernoulli principle), which eliminates the need for the isolation packers discussed above.

Two tubular nipples 34 and 36 are formed at the respective ends of the housing 30 and preferably are formed integrally with the housing. The nipples 34 and 36 have a smaller diameter than that of the housing 30 and are externally threaded, and the corresponding end portion of the work string 16 (FIG. 1) is internally threaded to secure the work string to the housing 30 via the nipple 34.

The valve sub 26 is formed by a tubular housing 40 that includes a first longitudinal flow passage 42 extending from one end of the housing and a second longitudinal flow passage 44 extending from the passage 42 to the other end of the housing. The diameter of the passage 42 is greater than that of the passage 44 to form a shoulder between the passages, and a ball 46 extends in the passage 42 and normally seats against the shoulder.

An externally threaded nipple 48 extends from one end of the casing 40 for connection to other components (not shown) that may be used in the stimulation process, such as sensors, recorders, centralizers and the like. The other end of the housing 40 is internally threaded to receive the externally threaded nipple 36 of the jet sub 20 to connect the housing 40 of the valve sub 26 to the housing 30 of the jet sub.

It is understood that other conventional components, such as centering devices, BOPs, strippers, tubing valves, anchors, seals etc. can be associated with the system of FIG. 1. Since these components are conventional and do not form any part of the present invention, they have been omitted from FIG. 1 in the interest of clarity.

In operation, the ball 46 is dropped into the work string 16 while the stimulation fluid is continuously pumped from the ground surface through the work string 16 and the jet sub 20 and to the valve sub 26. In the valve sub 26, the ball 46 passes through the passage 42 and seats on the shoulder between the passages 42 and 44. The fluid pressure thus builds up in the subs 20 and 26, causing the stimulation fluid to discharge through the openings 22.

The pumping rate of the stimulation fluid is then increased to a level whereby the pressure of the stimulation fluid jetted through the openings 22 reaches a relatively high differential pressure and high discharge velocity such as those set forth above.

During the above operation, a gas, consisting essentially of carbon dioxide or nitrogen, is pumped from the ground surface and into the annulus 28 (FIG. 1). The gas flows through the annulus 28 and the stimulation fluid mixes with and carries the gas from the annulus towards the formation causing a high energy mixing to generate foam with the resulting mixture hereinafter being referred to as a "mixture."

The mixture is jetted towards the formation and impacts the wall of the formation forming the wellbore 12. The confined mixture will pressurize the cavities in the formation and, as each of the cavities becomes sufficiently deep, the formation will fracture when the pressure is sufficiently high. Paths for the mixture are created in the bottoms of the above cavities in the formation which serve as output ports into the formation, with the annulus 28 serving as an input port to the system. Thus a virtual jet pump is created which is connected directly to the fracture. Moreover, each cavity becomes a small mixing chamber which significantly improves the homogeneity and quality of the foam. This high quality foam is then either pushed into the fracture or returned into the wellbore area.

If the jet pressure and the pressure in the annulus 28 is not high enough to cause fracturing, and if this combined pressure is higher than the pore pressure in the formation, then "squeezing" will occur. Alternatively, if, after the fracturing discussed above, it is desired to squeeze, the pressure of the mixture in the annulus 28 is reduced to a squeeze level pressure which is higher than the pressure in the pores in the formation.

In either of the above cases, according to the squeezing process, a greater quantity of the mixture will go through the larger pores in the formation than through the smaller pores, and the larger pores will be substantially increased in size to form channels or "wormholes" for the mixture to flow through. The presence of the foam in the mixture retards the reaction of the acid in the mixture with the formation so that the reach of the mixture into the formation is substantially extended when compared to techniques in which foam is not employed. Furthermore, the foam is of a high quality which increases the selectivity and effectiveness of the treatment. As the mixture in the wellbore 10 is pressurized against the wellbore walls and fracture faces in the manner discussed above, the foam bubbles tend to plug the smaller pores while entering the larger pores so that the acid portion of the mixture reacts with the formation material, thus further enlarging the larger pores. Thus, significant squeezing is achieved to create channels, also termed "fingering" or "wormholing," in the fracture faces and the wellbore wall, with the reaction of the mixture with the formation being relatively slow so that the mixture can penetrate deep into the formation matrix. At the end of the squeeze, as the annulus 28 pressure is reduced, the fracture closes, and the flow back of the mixture to the wellbore creates channeling or wormholes along the fracture face.

If it is desired to create a relatively large fracture, the pressure of the mixture in the annulus 28 around the sub 20 is controlled so that it is greater that the squeeze pressure, and slightly less than the hydraulic fracturing pressure, discussed above. The impact or stagnation pressure will bring the net pressure substantially above the required fracturing pressure; and therefore a substantially large fracture (such as 25 ft to 500 ft or more in length) can be created. In this process, the foam reduces mixture loss into the fracture face and/or the natural fractures. With the reduced loss of the mixture, most of the mixture volume can be used as a means for extending the fracture to produce the relatively large fracture. Since the fracture pressures are higher than the squeeze pressure discussed above, fingering of the mixture into the fracture face can occur simultaneously as discussed in the squeezing operation discussed above.

After the above operations, if it is desired to clean out foreign material such as debris, pipe dope, etc. from the wellbore 10, the work string 16, and the subs 20 and 26, the pressure of the stimulation fluid in the work string 16 is reduced and a cleaning fluid, such as water, at a relatively high pressure, is introduced into the annulus 28. After reaching a depth in the wellbore 10 below the subs 20 and 26, this high pressure cleaning fluid flows in an opposite direction to the direction of the stimulation fluid discussed above and enters the discharge end of the flow passage 44 of the valve sub 26. The pressure of the cleaning fluid forces the ball valve 46 out of engagement with the shoulders between the passages 42 and 44 of the sub 26. The ball valve 46 and the cleaning fluid pass through the passage 42, the jet sub 20, and the work string 16 to the ground surface. This circulation of the cleaning fluid cleans out the foreign material inside the work string 16, the subs 20 and 26, and the well bore 10.

After the above-described cleaning operation, if it is desired to initiate the discharge of the stimulation fluid against the formation wall in the manner discussed above, the ball valve 46 is dropped into the work string 16 from the ground surface in the manner described above, and the stimulation fluid is introduced into the work string 14 as discussed above.

FIG. 4 depicts a stimulation system, including some of the components of the system of FIGS. 1–3 which are given the same reference numerals. The system of FIG. 4 is installed in an underground wellbore 50 having a substantially vertical section 50a extending from the ground surface and a deviated, substantially horizontal section 50b that extends from the section 50a into a hydrocarbon producing subterranean formation 52. As in the previous embodiment, the casing 14 extends from the ground surface into the wellbore section 50a.

The stimulation system of FIG. 4 includes a work string 56, in the form of piping or coiled tubing, that extends from the ground surface, through the casing 14 and the wellbore section 50a, and into the wellbore section 50b. As in the previous embodiment, stimulation fluid is introduced into the end of the work string 56 at the ground surface (not shown). One end of the tubular jet sub 20 is connected to the other end of the work string 56 in the manner described above for receiving and discharging the stimulation fluid into the wellbore section 50b and into the formation 52 in the manner described above. The valve sub 26 is connected to the other end of the jet sub 20 and controls the flow of the stimulation fluid through the jet sub in the manner described above. The respective axes of the jet sub 20 and the valve sub 26 extend substantially horizontally in the wellbore section 50b so that when the stimulation fluid is pumped through the work string 56, it enters the interior of the jet sub 20 and is discharged, in a substantially radial or angular direction, through the wellbore section 50b and against the formation 52 to fracture and squeeze it in the manner discussed above. The horizontal or deviated section of the wellbore is completed openhole and the operation of this embodiment is identical to that of FIG. 1. It is understood that, although the wellbore section 50b is shown extending substantially horizontally in FIG. 4, the above embodiment is equally applicable to wellbores that extend at an angle to the horizontal.

In connection with formations in which the wellbores extend for relatively long distances, either vertically, horizontally, or angularly, the jet sub 20, the valve sub 26 and workstring 56 can be initially placed at the toe section (i.e., the farthest section from the ground surface) of the well. The fracture acidizing and squeezing process discussed above can then be repeated numerous times throughout the horizontal wellbore section, such as every 100 to 200 feet. Alternatively, this process can be performed in a continuous manner by moving the workstring 56, and therefore the sub 20, relatively slowly and continuously towards the ground surface causing the sub to be dragged through hills and valleys of the wellbore. When the jet sub 20 is at the top of the "hill," i.e., when the jets are almost touching the inner surface of the wellbore, a fracture occurs; when it is in a valley, fractures can not start. Also, squeezing will occur as discussed earlier.

Figure 5:
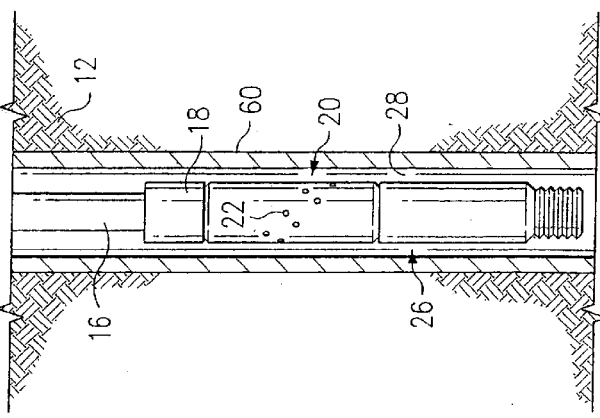
FIG. 5 is a view similar to that of FIG. 1 but depicting an alternate embodiment of the fracturing apparatus of the present invention shown in a vertical wellbore.

The embodiment of FIG. 5 is similar to that of FIG. 1 and utilizes many of the same components of the latter embodiments, which components are given the same reference numerals. In the embodiment of FIG. 5, a casing 60 is provided which extends from the ground surface (not shown) into the wellbore 10 formed in the formation 12. The casing 60 extends for the entire length of that portion of the wellbore in which the workstring 16 and the subs 20 and 26 extend. Thus, the casing 60, as well as the axes of the subs 20 and 26 extend substantially vertically.

Prior to the introduction of the stimulation fluid into the jet sub 20, a liquid mixed with sand is introduced into the jet sub 20 and discharges from the openings 22 in the jet sub and against the inner wall of the casing 60 at a very high velocity, causing tiny openings to be formed through the latter wall. Then the operation described in connection with the embodiments of FIGS. 1–3 above is initiated, and the mixture of stimulation fluid and foamed gas discharge, at a relatively high velocity, through the openings 22, through the above openings in the casing 60, and against the formation 12 to fracture and squeeze it in the manner discussed above. Otherwise the operation of the embodiment of FIG. 5 is identical to those of FIGS. 1–4.

Figure 6:
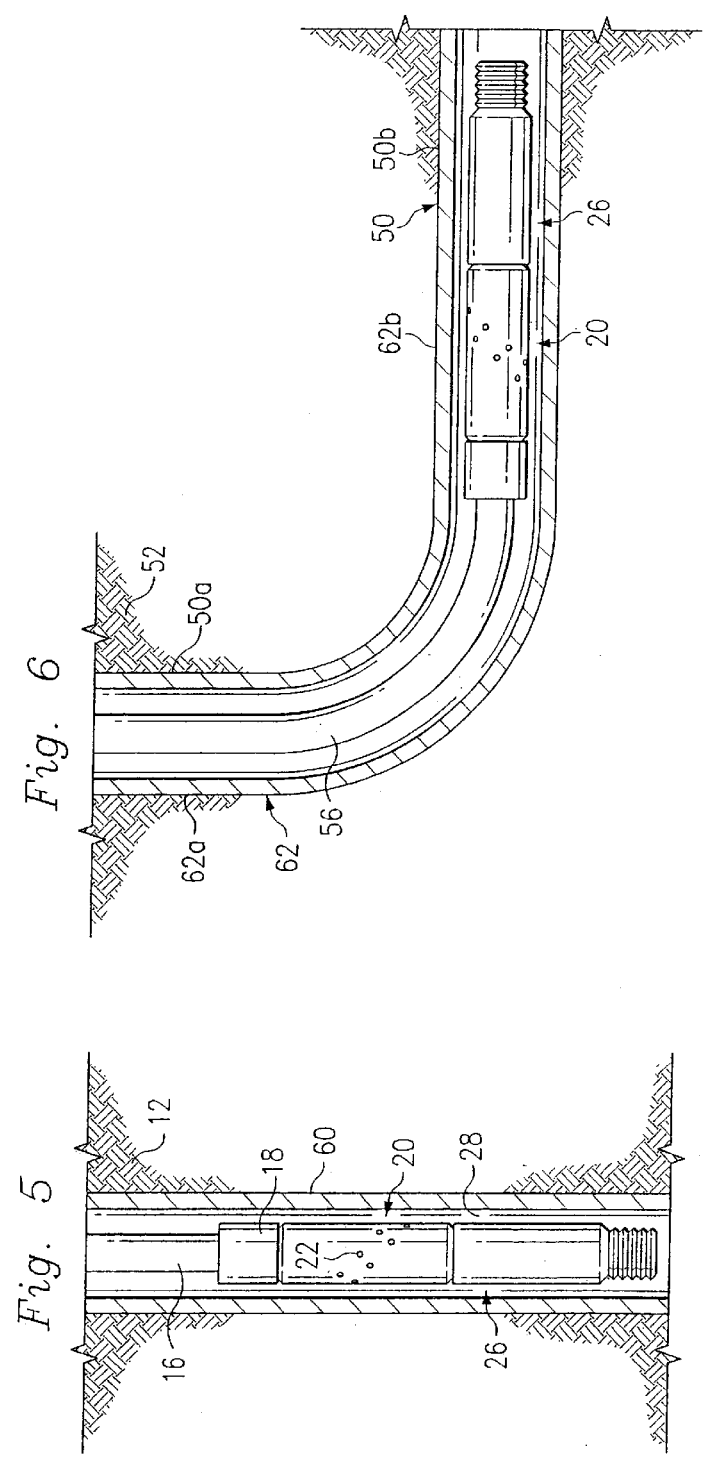
FIG. 6 is a view similar to that of FIG. 5, but depicting the fracturing apparatus of the embodiment of FIG. 5 in a wellbore having a horizontal deviation.

The embodiment of FIG. 6 is similar to that of FIG. 4 and utilizes many of the same components of the latter embodiments, which components are given the same reference numerals. In the embodiment of FIG. 6, a casing 62 is provided which extends from the ground surface (not shown) into the wellbore 50 formed in the formation 52. The casing 62 extends for the entire length of that portion of the wellbore in which the workstring 56 and the subs 20 and 22 are located. Thus, the casing 62 has a substantially vertical section 62a and a substantially horizontal section 60b that extend in the wellbore sections 50a and 50b, respectively. The subs 20 and 26 are located in the casing section 62b and their respective axes extend substantially horizontally.

Prior to the introduction of the stimulation fluid into the jet sub 20, a liquid mixed with sand is introduced into the work string 16 with the ball valve 46 (FIG. 3) in place. The liquid/sand mixture discharges from the openings 22 (FIG. 2) in the jet sub 20 and against the inner wall of the casing 62 at a very high velocity, causing tiny openings to be formed through the latter wall. Then the stimulation operation described in connection with the embodiments of FIGS. 1–3, above, is initiated with the mixture of stimulation fluid and foamed gas discharging, at a relatively high velocity, through the openings 22, through the above openings in the casing 62, and against the wall of the formation 52 to impact it in the manner discussed above. Otherwise the operation of the embodiment of FIG. 6 is identical to those of FIGS. 1–3.

Equivalents and Alternatives

It is understood that variations may be made in the foregoing without departing from the scope of the invention. For example, gas flowing in the annulus 28 can be premixed with some liquids prior to entering the casing 14 for many reasons such as cost reduction and increasing hydrostatic pressure. Moreover the makeup of the stimulation fluid can be varied within the scope of the invention. Further, the particular orientation of the wellbores can vary from completely vertical to completely horizontal. Still further, the particular angle that the discharge openings extend relative to the axis of the jet sub can vary. Moreover, the openings 22 in the sub 20 could be replaced by separately installed jet nozzles that are made of exotic materials such as carbide mixtures for increased durability. Also, a variety of other fluids can be used in the annulus 28, including clean stimulation fluids, liquids that chemically control clay stability, and plain, low-cost fluids.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A method of stimulating a downhole formation comprising locating a plurality of jet nozzles in a spaced relation to the wall of the formation to form an annulus between the nozzles and the formation, pumping an acid-containing, stimulation fluid at a predetermined pressure through the nozzles into the annulus and against the wall of the formation, and pumping a gas into the annulus so that the stimulation fluid mixes with the gas to generate foam before the mixture is jetted towards the formation to impact the formation wall.

2. The method of claim 1 wherein the acid in the mixture reacts with the formation to form channels in the formation walls.

3. The method of claim 2 wherein the foam in the mixture retards the reaction of the acid in the mixture with the formation.

4. The method of claim 3 wherein the retardation of the acid reaction causes extension of the channels.

5. The method of claim 1 wherein the pressure is sufficient to form a fracture.

6. The method of claim 5 wherein the mixture is forced into the fracture to further extend the fracture.

7. The method of claim 6 further comprising reducing the pressure to a value between the fracturing pressure and the pressure at the pores in the formation.

8. The method of claim 7 wherein the jetted mixture flows to the formation wall.

9. The method of claim 8 wherein the acid in the mixture reacts with the formation wall to form channels in the formation wall.

10. The method of claim 9 wherein the foam in the mixture retards the reaction of the acid in the mixture with the formation wall.

11. The method of claim 10 wherein the retardation of the acid reaction causes extension of the channels.

12. The method of claim 11 further comprising further reducing the pressure of the mixture and the fluid pressure in the annulus to allow closure of the fracture.

13. The method of claim 12 wherein, after the fracture closes, the mixture flows out from the fracture and creates channels in the fracture walls.

14. The method of claim 5 wherein the acid in the mixture reacts with the formation to form channels in the fracture faces.

15. The method of claim 14 wherein the foam in the mixture retards the reaction of the acid in the mixture with the formation.

16. The method of claim 15 wherein the retardation of the acid reaction causes extension of the channels.

17. The method of claim 1 wherein the pressure is not sufficient to form a fracture and wherein the mixture is forced into the pores of the formation.

18. The method of claim 17 wherein the acid in the mixture reacts with the formation to form channels in the formation walls.

19. The method of claim 18 wherein the foam in the mixture retards the reaction of the acid in the mixture with the formation.

20. The method of claim 1 wherein a wellbore is formed in the formation and has a vertical component and a horizontal component.

21. The method of claim 20 wherein the step of locating the jet nozzles comprises attaching the jet nozzles to a work string and inserting the work string in the wellbore.

22. The method of claim 20 further comprising inserting a casing in the formation and pumping a liquid/sand mixture through the jet nozzles so as to perforate the casing prior to the steps of pumping.

* * * * *